Oct. 15, 1968     R. NEUSCHOTZ     3,405,752
STRUCTURE AND INSTALLATION OF THREADED ELEMENTS
HAVING SERRATED LOCKING PORTION
Filed Feb. 1, 1966     2 Sheets-Sheet 1
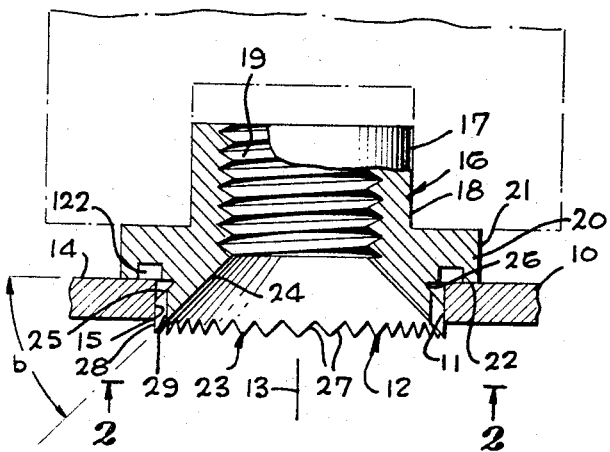
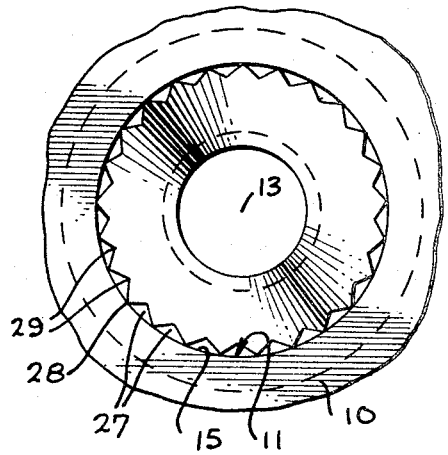
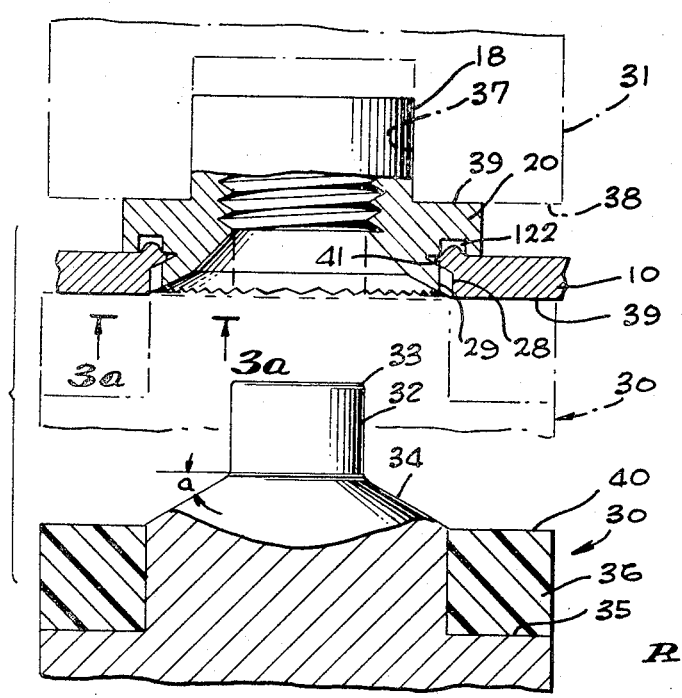
ROBERT NEUSCHOTZ
INVENTOR.
BY William P. Green
ATTORNEY

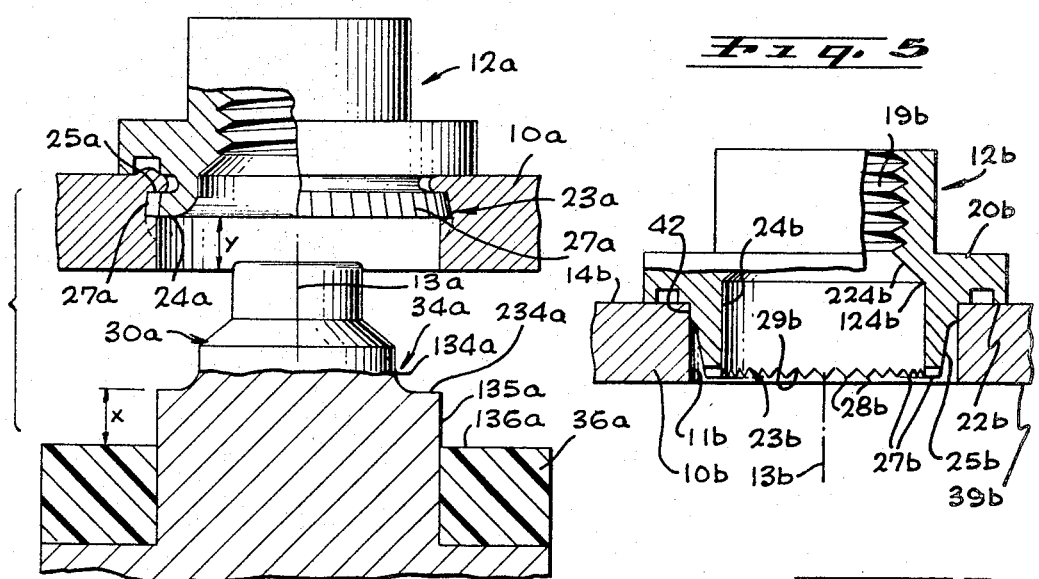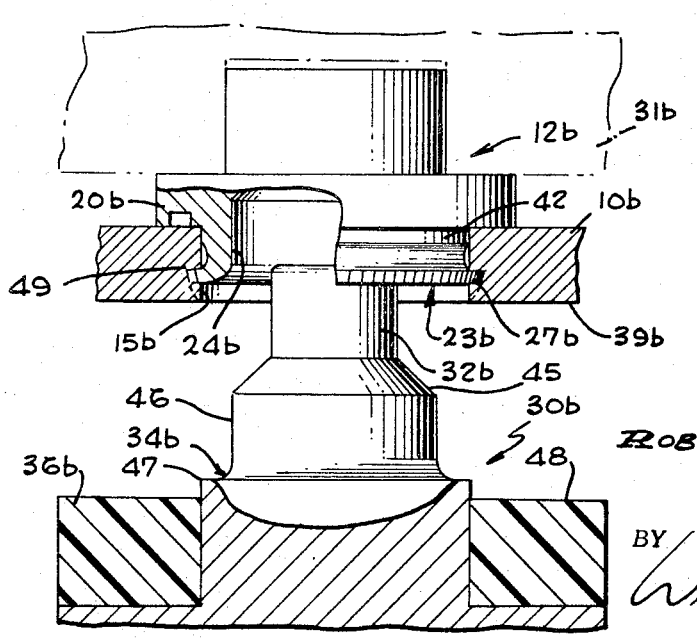

United States Patent Office 3,405,752
Patented Oct. 15, 1968

3,405,752
STRUCTURE AND INSTALLATION OF THREADED ELEMENTS HAVING SERRATED LOCKING PORTION
Robert Neuschotz, 1162 Angelo Drive, Beverly Hills, Calif. 90210
Filed Feb. 1, 1966, Ser. No. 524,085
4 Claims. (Cl. 151—41.72)

ABSTRACT OF THE DISCLOSURE

Structure and installation of threaded elements having a flange engageable with a carrier part about an opening, and having a locking portion projecting into the opening and terminating in an edge having serrations which are deformed radially outwardly and axially toward the flange into locking engagement with the material of the carrier part.

---

This invention relates to the structure and installation of an improved type of threaded element which is adapted to be connected into an opening in a carrier part. The invention is in certain respects especially concerned with, and will be described primarily as applied to, the provision of threaded nuts for connecting into apertures in sheet metal structures.

A major object of the invention is to provide a threaded element which is adapted to be very easily and simply secured to a carrier part, but which engages that carrier part in a manner locking the element very effectively and positively against displacement from or movement relative to the carrier part. Preferably, the element is so designed as to be permanently connectible to the sheet metal or other carrier part by simply applying pressure against the element in a predetermined manner acting to deform the body of the threaded element into holding engagement with the carrier part. Further, an element embodying the invention is designed in a manner enabling its formation very simply and inexpensively as a single unitary fastener body, which may be manufactured rapidly and in large quantities by screw machines or other mass production tools. At the same time, the connection of the element to the carrier part is more effective than has been possible with any of the prior similar arrangements with which I am familiar.

One previously developed nut which has been intended to serve the same general purpose as the present element has been of a type having an annular recess in its outer surface, with the nut being so constructed as to force some of the material of the carrier part into that recess when the element is pressed axially against the carrier part, to thereby lock the element against detachment. This prior arrangement, however, and all other similar devices with which I am familiar, have had the common disadvantage of being inapplicable to use in connection with carrier parts formed of magnesium, since the pressure required for forcing the magnesium into the peripheral recess in such a nut has been so great as to crush the magnesium and destroy its integrity about the opening which receives the nut, so that an effective connection between the nut and carrier part has been impossible. Further, a recesssed nut of the discusssed type has required an excessive application pressure, in order to properly force the carrier part material to flow into the peripheral recess or groove.

A particular object of the present invention is to provide a nut or other threaded element of the discussed general type which may be connected to a carrier part in a manner such that the attachment of the element to that part will not crush or otherwise damage a magnesium part sufficiently to prevent an effective and permanent connection from being formed. Additionally contemplated is an element whose manner of application will enable attachment to a carrier part with a smaller pressure than the discussed prior devices.

Structurally, an element embodying the invention includes a body having a flange adapted to bear axially against a surface of a carrier part, about an opening in the carrier part, and having a locking portion which projects axially beyond the flange and into the opening in the carrier part. This locking portion has an edge which carries a series of serrations, and which is adapted to be deformed generally axially toward the flange in a manner causing the serrations to bite or dig into the material of the carrier part about the opening, and in this way effectively and rigidly lock the element within the opening and against detachment from the carrier part. Desirably, the serrations are formed at the extremity of the body. In one form of the invention, the locking portion flares progressively radially outwardly as it advances axially so that the exertion of force axially against the flaring and preferably essentially annular locking portion acts to deform that portion both radially outwardly and axially toward the flange, to provide an extremely effective interlock with the carrier part. In another form of the invention, the locking portion initially extends essentially axially, preferably directly axially, and carries serrations which project essentially axially, and are distortable radially outwardly and then axially through approximately 90 degrees into locking relation with the carrier part. In the first mentioned form of the invention, the element may be centered within the opening in the carrier part by reception of the serrations in closely spaced relation with the wall of the opening, while in the second form of the invention, the element may be centered by a locating surface positioned axially between the flange and serrations, and of a diameter smaller than the flange but greater than the serrations.

The above and other features and objects of the invention will be better understood from the following detailed description of the typical embodiments illustrated in the accompanying drawings, in which:

FIG. 1 is an axial section through a first form of plate nut constructed in accordance with the invention, shown positioned within an opening in a metal sheet prior to deformation of the nut into locking relation with respect to the sheet;

FIG. 2 is a view taken on line 2—2 of FIG. 1;

FIG. 3 is a view similar to FIG. 1, but showing the nut after having been deformed into connected relation with respect to the carrier part or sheet, and also showing the deforming tool;

FIG. 3a is a fragmentary view on line 3a—3a of FIG. 3;

FIG. 4 is a view similar to FIG. 3 but showing a different type of deforming tool;

FIG. 5 is a view similar to FIG. 1, but showing a third form of the invention;

FIG. 6 shows the nut of FIG. 5 after being locked in place, and also shows the deforming tool; and FIG. 7 shows another form of the invention.

Referring first to FIG. 1, I have shown at 10 a carrier part taking the form of a rigid metal sheet having an opening 11 until which a threaded element 12 embodying the invention is to be connected. Element 12 is illustrated as an internally threaded nut, though it is contemplated that the invention may also be applied to elements having external threads. Opening 11 is desirably a circular opening, centered about an axis 13 which is perpendicular to the plane of a planar surface 14 of carrier part 10. The opening may be defined by an inner wall or surface 15 of the opening, which may be of straight cylindrical configuration centered about axis 13.

The element 12 preferably has a unitary one-piece body 16 which may be formed of an appropriate rigid metal such as steel, having sufficient deformability to enable the locking action which will be discussed hereinbelow. Body 16 has a tubular portion 17 which may be externally cylindrical at 18, and contains internal threads 19 centered about axis 13. At the axially outer end of portion 17, body 16 has an enlarged diameter flange 20, which may have an outer cylindrical surface 21 and may present an annular surface 22 disposed transversely of axis 13 and engageable axially against surface 14 of the carrier part. An annular groove 122 is desirably formed in body 16 radially inwardly of surface 22, for ultimate reception of deformed material of the carrier part, but it is contemplated that in some instances this groove may be unnecessary and be deleted.

Projecting axially beyond the plane of surface 22, body 16 of element 12 forms a locking portion 23 of the element, which may be considered as taking the form essentially of a second flange, which is essentially annular about axis 13, and flares progressively radially outwardly as it advances axially (downward as viewed in FIG. 1). Stated differently, this locking portion or second flange 23 may be essentially frusto-conical, and be defined at its radially inner side by an inner frusto-conical or flaring annular surface 24 centered about axis 13, and at its radially outer side by a second flaring frusto-conical surface 25 also centered about axis 13 and desirably extending parallel to surface 24. These two surfaces may continue radially outwardly to a diameter approximately equal to, or very slightly less than, the diameter of the inner wall surface 15 of aperture 11 in the carrier part. As will be apparent from FIG. 1, surface 25 may continue radially inwardly to the location of an essentially annular fillet 26, at which surface 25 meets essentially transverse surface 22 of body 16.

The periphery of flaring locking portion or flange 23 is shaped to form a series of circularly spaced serrations 27 (see FIG. 2), which taper radially outwardly, as seen in FIG. 2, to the location of outer peaks 28 of the serrations forming axially extending edges disposed parallel to axis 13 and received in close proximity to inner wall 15 of opening 11 in the carrier part. The serrations may extend continuously from surface 24 to surface 25, and may have the same transverse cross-section along their entire axial extent, with that cross-section being as indicated in FIG. 2. The valley or minimum diameter portions 29 of the serrations thus extend axially, parallel to axis 13, at a diameter spaced inwardly from the diameter of peaks 28.

With reference now to FIG. 3, the locking portion 23 of element 12 is adapted to be deformed into locked relation with respect to carrier part 10 by means of a flaring tool 30 coacting with an anvil or backing part 31. Tool 30 has a pilot portion 32 which may be of externally cylindrical configuration, and appropriately rounded at its end 33, and dimensioned to fit closely within the minor diameter of threads 19. Beyond its pilot portion 32, tool 30 has a flaring surface 34, which may be frusto-conical, but disposed at an angle $a$ with respect to a transverse plane which is less than the initial angle $b$ of locking portion 23 and its surfaces 24 and 25 with respect to the same plane. About annular surface 34, flaring tool 30 may contain an annular recess 35 within which there is received a stop-ring 36 of an appropriate cushioning material, such as nylon, which is slightly deformable (more deformable than the main body of the tool), and engages the axially outer side of carrier part 10 to limit the upward movement of the tool. Anvil 31 may have a cylindrical recess 37 adapted to receive portions 18 of element 12, and presenting a transverse annular surface 38 adapted to bear downwardly against transverse surface 39 of flange 20, to back up element 12 during a locking operation.

To now describe the operations performed in connecting element or nut 12 to the sheet metal carrier part 10, the first step is to insert locking portion 23 of element 12 axially into opening 11 to the position illustrated in FIG. 1. In this position, the engagement of outer sharp edges 28 of serrations 27 with the inner wall surface 15 of opening 11 acts to effectively center element 12 relative to and within the opening, to properly locate the element for connection to the carrier part. Also, engagement of transverse surface 22 on the body of element 12 with outer surface 14 of the carrier part prevents further advancement of the element into opening 11, and locates element 12 axially relative to the carrier part. Next, anvil 31 may be moved into the FIG. 3 position of engagement with element 12, and be backed up in that position against upward movement. Finally, flaring tool 30 is pressed upwardly as viewed in FIG. 3, so that its pilot portion 32 extends into threads 19 of element 12, and flaring surface 34 ultimately moves into engagement with annular surface 24 of portion 23 of element 12. As the tool is pressed further upwardly, surface 34 acts to progressively deform or deflect locking portion or second flange 23 of element 12 upwardly to the condition illustrated in FIG. 3, with this deformation acting to force the periphery of locking portion 23 axially toward flange 20, and at the same time radially outwardly by virtue of the flaring configuration of portion 23. Thus, serrations 27 are correspondingly forced axially and radially outwardly into the material of the carrier part about the periphery of opening 11, and to the FIG. 3 condition in which the lower extremities of the serrations lie essentially within the plane of undersurface 39 of the carrier part. At this position, the upper transverse surface 40 of nylon ring 36 annularly contacts surface 39 of the carrier part, to halt the upward movement of flaring tool 30, and thus terminate the deforming action in the FIG. 3 condition. As also will be apparent from FIG. 3, the discussed deformation of the serrations and their carrying flange or locking portion 23 forces some of the material of carrier part 10 which is confined between the serrations and flange 20 radially inwardly as indicated at 41, and may force some of the deformed material upwardly into groove 122. The material of the sheet is so confined between the deformed serrations and flange 20 as to positively lock element 12 against any axial shifting movement relative to the carrier part. The reception of the serrations within the material of the carrier part further locks element 12 against any possibility of rotation about axis 13 relative to the carrier part, so that element 12 has in this way been connected very rigidly and permanently in fixed relation with respect to the carrier part.

In order to enable the discussed deformation of locking portion 23, element 12 is formed of a material which is capable of such deformation without tearing or otherwise damaging the material of element 12, or destroying its rigidity in the deformed condition. Preferably, element 12 is for this purpose formed of an appropriate metal, having the desired deformability and rigidity, such as for example 6061 steel.

FIG. 4 illustrates a nut element 12a which may initially be the same as element 12 of FIG. 1, but is deformed by a different tool 30a into engagement with a thicker carrier sheet 10a. To coact with the thicker sheet, the tool has a cylindrical outer surface 135a projecting upwardly beyond the transverse annular stop surface 136a of nylon stop ring 36a. The annular surface 34a which engages and deforms the nut element may curve progressively through 90 degrees, as viewed in axial section, from a directly axial portion 134a of this surface to a directly transverse portion 234a which meets the extremity of surface 135a. As will be apparent, this curving surface 34a acts to deform the locking portion 23a of element 12a beyond the angular or inclined position of FIG. 3, and to a more directly transverse condition, in which its undersurface 24a and upper surface 25a are disposed approximately transversely of axis 13a, so that the serrations 27a also project approximately directly radially outwardly. The axial length x of surface 135a should correspond substantially to the axial distance y that the locking serrations 27a are to be inset upwardly within the carrier part, so that engagement of ring 36a with the carrier part will properly limit the deforming or locking action in the FIG. 4 condition.

FIG. 5 shows another plate nut or element 12b embodying the invention, as it appears prior to deformation into locking relation with sheet metal carrier part 10b. The nut 12b may be the same as element 12 of FIGS. 1 to 3, except as to the manner of formation of the nut axially outwardly beyond the plane of transverse surface 22b which engages the outer surface 14b of the carrier part. Beyond this plane nut 12b has a tubular locking portion 23b which may extend and project substantially directly axially, and is defined at its radially inner side by an inner desirably cylindrical surface 24b which merges at 124b with a tapering chamfer surface 224b, all of course centered about axis 13b of the nut. Externally, the nut 12b may have a short cylindrical surface 42 of a diameter to fit closely within and be centered by opening 11b, and beyond surface 42 may have a tapering annular surface 25b, desirably of frusto-conical configuration, and centered about axis 13b.

At the axially outer extremity of locking portion 23b, the tubular wall of this locking portion is shaped to form a series of circularly spaced typically identical serrations 27b, which project and face essentially directly axially, and each of which may be of approximately uniform cross-section along its entire radial extent (that cross-section being brought out in FIG. 5). More particularly, the discussed cross-section may be such as to form relatively sharp peaks 28b of the serrations desirably extending directly radially outwardly from axis 13b, and with the valleys 29b also desirably extending directly radially outwardly from axis 13b. The serrations may taper progressively as they advance axially from the transverse plane of valleys 29b to the transverse plane of peaks 28b.

FIG. 6 shows at 30b a tool which may be utilized for curling the locking portion 23b of nut or element 12b to the FIG. 6 condition for completing the interlock between the nut and carrier part 10b. This tool has a pilot portion 32b adapted to fit closely within the minor diameter of threads 19b. Axially beyond pilot portion 32b, the tool has a tapering frusto-conical surface 45, and beyond this surface, the tool may have an annular curving surface 34b, which like the outer surface of pilot 32b and surface 45 is centered about axis 13b, and has the progressively radially outwardly curving cross-section illustrated in FIG. 6. To describe this surface 34b more specifically, it may have at 46 a portion extending directly axially at a diameter approximately the same as the diameter of inner surface 24b of the nut. In extending axially downwardly (as seen in FIG. 6) from the location of portion 46, surface 34b gradually curves radially outwardly, desirably through 90 circular degrees to ultimately extend directly transversely of axis 13b at 47. Preferably, the portion 47 of this surface is disposed slightly above the level of upper surface 48 of nylon stop-ring 36b (say .010 to .020 inch above that level). The curving portion of surface 34b is directly axially opposite the locking portion 23b of nut 12b, in its initial undeformed condition, to deflect that locking portion radially outwardly.

To install nut 12b within carrier part 10b, the first step is of course to insert the locking portion of the nut into the opening 11b and to the position illustrated in FIG. 5. Next, an anvil 31b is placed against the nut in backing relation, following which tool 30b is pressed upwardly toward the anvil and against the locking portion of the nut, to progressively deform the locking portion (by engagement with surface 34b of the tool) radially outwardly and axially toward flange 20b, so that serrations 27b are forced into the material of carrier part 10b about the opening formed by wall 15b. This deforming action is halted when surface 48 of nylon stop-ring 36b contacts the undersurface of carrier part 10b, in which position the locking portion 23b has been deformed through approximately 90 circular degrees to the FIG. 6 condition, so that the periphery of the locking portion, and its serrations, extend approximately directly radially outwardly from axis 13b, rather than directly parallel to the axis as in FIG. 5. The undersurface 24b in this utimate condition of the nut has a portion extending radially outwardly and preferably slightly above the level of undersurface 39b of the carrier part.

In the FIG. 6 condition, the serrations effectively lock nut 12b within the carrier part and against rotation relative thereto, by virtue of the reception of some of the carrier part material circularly between the various serrations, and the confinement of some of the carrier part material axially between the serrations and flange 20b, at 49. As in the other forms of the invention, the nut is formed of a material, preferably an appropriate steel, which is capable of being deformed in the manner discussed without tearing or cracking of locking portion 23b, and with the locking portion in its ultimate FIG. 6 condition having sufficient rigidity to remain in the deformed condition and effectively resist any tendency for movement out of its locking relation with respect to the carrier part as a result of the imposition of rotary or axial forces against the nut.

FIG. 7 shows another form of the invention in which the nut element 12c has an external cylindrical surface at 111c, projecting beyond the plane of transverse shoulder 22c, and of a diameter to fit closely in opening 11c, with serrated locking portion 23c being located far enough beyond shoulder 22c to engage the relatively thick carrier sheet 10c adjacent its lower surface 39c. Locking portion 23c may initially be shaped as shown in broken lines in FIG. 7 (similar to the FIG. 1 configuration) and may be deformable by a tool such as that shown in FIG. 1 to the full line condition of FIG. 7.

I claim:

1. An element to be secured to a carrier part containing an opening of a predetermined size, comprising a body carrying threads to which a mating part may be connected, said body having a flange of a size larger than said opening adapted to bear axially against a surface of said carrier part about the opening, said body having a locking portion smaller in diameter than said flange and projecting axially beyond the flange and small enough to be inserted axially into said opening, said locking portion terminating at an edge having serrations which are of a diameter smaller than said flange and small enough to be insertible into the opening as the flange is moved into engagement with the carrier part about the opening, said locking portion being formed of a material which is deformable axially relative to and toward said flange and being positioned to force said serrations into said carrier part about said opening upon such deformation to lock the element non-rotatively in the opening, said locking portion of the body being generally tubular and having a generally smooth external surface and projecting approximately directly axially to an extremity thereof at which said edge and serrations are formed, said serrations projecting essentially directly axially at said edge and being deformable radially outwardly to an increased diameter and then axially toward said flange to bite into the carrier part about said opening, said serrations tapering axially to terminal edges which extend substantially directly radially and substantially across the end edge of said tubular locking portion.

2. An element to be secured to a carrier part containing an opening of a predetermined size, comprising a body carrying threads to which a mating part may be connected, said body having a flange of a size larger than said opening adapted to bear axially against a surface of said carrier part about the opening, said body having a locking portion smaller in diameter than said flange and projecting axially beyond the flange and small enough to be inserted axially into said opening, said locking portion terminating at an edge having serrations which are of a diameter smaller than said flange and small enough to be insertible into the opening as the flange is moved into engagement with the carrier part about the opening, said locking portion being formed of a material which is deformable axially relative to and toward said flange and being positioned to force said serrations into said carrier part about said opening upon such deformation to lock the element non-rotatively in the opening, said locking portion of the body being generally tubular and projecting approximately directly axially to an extremity thereof at which said edge and serrations are formed, said serrations projecting essentially directly axially at said edge and tapering to reduced dimensions as they advance axially in a direction away from said flange, said locking portion being formed of a material which is deformable radially outwardly in a relation curling said initially axially projecting and axially tapering serrations to more radially projecting and radially tapering positions and forcing them into the material of the carrier part about said opening.

3. An element as recited in claim 2, in which said locking portion has a smooth cylindrical outer surface between said serrations and said flange and of a diameter greater than the serrations but less than the flange to engage the carrier part within said opening and center the element relative thereto.

4. The method of attaching to a carrier part containing an opening a threaded element having a flange too large to enter the opening and having a deformable locking portion which is essentially tubular and smaller in diameter than said flange and which projects essentially axially beyond said flange and terminates in an edge provided with serrations which project substantially directly axially and progressively taper axially to reduced dimensions as they advance in an axial direction away from the flange; said method including inserting said locking portion of the element into said opening to a position in which said flange engages axially against said carrier part about the opening, then curling the extremity of said initially essentially axial locking portion radially outwardly to a position in which said initially axially projecting and axially tapering serrations project and taper generally radially outwardly and bite into the material of the carrier part about said opening.

References Cited

UNITED STATES PATENTS

| 2,409,294 | 10/1946 | Martin | 29—512 |
| 2,415,695 | 2/1947 | Kann | 29—512 |
| 2,444,145 | 6/1948 | Rosan | 151—41.73 |
| 3,204,679 | 9/1965 | Walsh | 151—41.72 |

FOREIGN PATENTS 706,987   4/1954   Great Britain.

EDWARD C. ALLEN, *Primary Examiner.*